(12) United States Patent
Ijuin et al.

(10) Patent No.: US 9,674,900 B2
(45) Date of Patent: Jun. 6, 2017

(54) INDUCTION HEATING APPARATUS FOR A BEVERAGE CAN

(75) Inventors: Taichi Ijuin, Sagamihara (JP); Tetsuya Takatomi, Sagamihara (JP); Norihiko Ozaku, Sagamihara (JP); Osamu Yoshida, Sagamihara (JP)

(73) Assignee: DAIWA CAN COMPANY, Tokyo (JP)

( * ) Notice: Subject to any disclaimer, the term of this patent is extended or adjusted under 35 U.S.C. 154(b) by 655 days.

(21) Appl. No.: 14/116,561

(22) PCT Filed: May 10, 2011

(86) PCT No.: PCT/JP2011/060772
§ 371 (c)(1),
(2), (4) Date: Mar. 12, 2014

(87) PCT Pub. No.: WO2012/153394
PCT Pub. Date: Nov. 15, 2012

(65) Prior Publication Data
US 2014/0197158 A1    Jul. 17, 2014

(51) Int. Cl.
*H05B 6/10* (2006.01)
*A47J 36/24* (2006.01)
(Continued)

(52) U.S. Cl.
CPC .......... *H05B 6/108* (2013.01); *A47J 36/2433* (2013.01); *G07F 9/105* (2013.01);
(Continued)

(58) Field of Classification Search
CPC . H05B 6/12; H05B 6/64; H05B 6/129; H05B 6/101; H05B 6/105; H05B 6/108;
(Continued)

(56) References Cited

U.S. PATENT DOCUMENTS

| 2007/0170174 A1* | 7/2007 | Segiet | G07F 9/105 |
| | | | 219/621 |
| 2008/0029505 A1* | 2/2008 | Rosenbloom | H05B 6/129 |
| | | | 219/622 |
| 2009/0306820 A1* | 12/2009 | Simmons | G07F 9/026 |
| | | | 700/244 |

FOREIGN PATENT DOCUMENTS

| JP | 2000 011247 | 1/2000 |
| JP | 3259808 | 12/2001 |

(Continued)

OTHER PUBLICATIONS

WO2006/080233, Aug. 2006, Machine Translation performed on Apr. 13, 2016.*

(Continued)

*Primary Examiner* — Brian Jennison
(74) *Attorney, Agent, or Firm* — Oblon, McClelland, Maier & Neustadt, L.L.P.

(57) ABSTRACT

An induction heating apparatus heats content efficiently while measuring a temperature of the heated content accurately. The induction heating apparatus includes a can holder, a heating coil disposed around the can holder, and a temperature measuring unit. A resealable metal beverage can having a thread formed on a neck portion and a cap screwed onto the neck portion is held by the can holder. The can holder holds the metal beverage can in a manner such that the cap of the can inserted thereto is exposed on an axially upper side. The temperature measuring unit measures a surface temperature of the cap of the metal beverage can held in the can holder.

4 Claims, 3 Drawing Sheets

(51) Int. Cl.
*G07F 11/70* (2006.01)
*G07F 9/10* (2006.01)
*G07F 17/00* (2006.01)

(52) U.S. Cl.
CPC .......... *G07F 11/70* (2013.01); *G07F 17/0078* (2013.01); *H05B 6/105* (2013.01)

(58) Field of Classification Search
CPC ......... F24C 7/10; F27D 11/00; A47J 36/2433; G07F 9/105; G07F 11/70; G07F 17/0078
See application file for complete search history.

(56) References Cited

FOREIGN PATENT DOCUMENTS

| JP | WO 2006080233 A1 * | 8/2006 | ............. G06F 9/105 |
|---|---|---|---|
| JP | 4562765 | 8/2010 | |
| JP | 2011 28397 | 2/2011 | |

OTHER PUBLICATIONS

International Search Report Issued Aug. 16, 2011 in PCT/JP11/060772 Filed May 10, 2011.

* cited by examiner (a)

(b)

(a) At the Start of Rotation (Rotational Speed: 0rpm)
(b) At 400prm
(c) At the Switching Phase of Rotational Direction (Rotational Speed: 0rpm)

INDUCTION HEATING APPARATUS FOR A BEVERAGE CAN

TECHNICAL FIELD

This invention relates to an induction heating apparatus for heating a canned beverage, and especially to an induction heating apparatus adapted to stop heating when a detected surface temperature of the can reaches a preset temperature.

BACKGROUND ART

Conventional warming apparatuses for canned beverages used in grocery stores are adapted to heat canned beverages in a glass case and to keep the canned beverages at a preset temperature. Therefore, consumers are allowed to purchase the warmed beverages in the glass case. Thus, the warming apparatus of this kind is adapted to keep the canned beverages at the desired temperature by raising a temperature in the glass case to the desired temperature. For this purpose, it is necessary to always energize a heating device of the warming apparatus. This means that the conventional warming apparatuses of this kind consume electricity continuously and a running cost thereof is therefore expansive. In addition, oxidation reactions of ingredients (e.g., vitamin C, starch, etc.) of the beverage are promoted by thus keeping the beverage warm, and as a result, color, flavor, taste etc. of the beverage in the can will be deteriorated. Thus, it is not preferable to keep the canned beverages in the warming apparatus. In order to avoid such disadvantages, heating apparatuses for heating the canned beverages quickly according to need have been proposed.

For example, Japanese Patent No. 3259808 discloses a heating device for canned drink adapted to heat a canned drink by applying high-frequency current to a heating coil wound around the can held by a rotary table rotated by a motor. Specifically, the can is held by a cylindrical guide except for an upper portion, and a temperature of the can is detected by a thermistor bolometer, a thermopile or the like at the exposed upper potion. Therefore, a heating of the can is stopped when the temperature of the upper portion of the can is raised to a preset temperature.

Japanese Patent No. 4562765 discloses an induction heating apparatus for a resealable metal beverage can sealed by a cap screwed onto a threaded neck portion (as will be called a resealable can hereinafter). The induction heating apparatus taught by Japanese Patent No. 4562765 is comprised of a heating coil wound around a cylindrical holder, and adapted to heat the resealable can held in the holder by energizing the coil to generate an induced current while rotating the holder. According to the teachings of Japanese Patent No. 4562765, in order to enhance an agitation effect, the holder is inclined with respect to a vertical line and the holder is rotated while changing a revolution speed.

Japanese Patent Laid-Open No. 2000-11247 discloses another induction heating device for canned beverage in which the can is placed sideways on a heating coil. According to the teachings of Japanese Patent Laid-Open No. 2000-11247, the induction heating device is comprised of rollers contacted with an outer surface of a can trunk, and those rollers are individually provided with a spiral groove or ridge. Therefore, the can is moved in an axial direction by rotating the rollers by a motor. In order to enhance an agitation effect, a rotational direction of the can is reversed repeatedly.

Thus, according to the teachings of Japanese Patent No. 3259808, the can is heated by applying high-frequency current to the heating coil wound around the can while rotating the can so that the content is heated by the heat of the can. However, if the can contains high viscosity beverage such as a corn soup, it is difficult to create a convection flow of the beverage by the heat of the can. In this case, therefore, the contents may be heated only in the vicinity of the inner face of the can and the central portion of the contents may not be heated sufficiently. In addition, as a result of heating the beverage can by the induction heating, the can itself produces a heat so that the surface temperature of the can is raised to be higher than that of the of the content. Therefore, if the heating is stopped at an instant when the temperature measured at the surface of the can reaches a preset temperature, the temperature of the content may be lower than the preset temperature.

Meanwhile, according to the teachings of Japanese Patent No. 4562765, the resealable can is heated by energizing the coil wound around the cylindrical holder. In this case, if the temperature of the can trunk is measured in the vicinity of the heating portion, the temperature of the can thus measured may be different from an actual temperature of the content.

DISCLOSURE OF THE INVENTION

The present invention has been conceived the forgoing technical problems, and an object of the present invention is to provide an induction heating apparatus for a beverage can, which can heat a content efficiently and measure a temperature of the content accurately.

The induction heating apparatus of the present invention is comprised of a can holder for holding a resealable metal beverage can and a heating coil disposed around the can holder to inductively heat the metal beverage can. Specifically, the resealable metal beverage can is comprised of a thread formed on a neck portion, and a cap screwed onto the neck portion to close the can. In order to achieve the above-mentioned object, the can holder is adapted to hold the metal beverage can in a manner such that the cap of the can inserted thereto is exposed on an axially upper side. In addition, the induction heating apparatus is provided with a temperature measuring means that measures a surface temperature of the cap of the metal beverage can held in the can holder.

The induction heating apparatus is further comprised of a rotating mechanism adapted to rotate the metal beverage can held in the can holder around a center axis of the can holder.

The rotating mechanism repeatedly switches a rotational direction of the metal beverage can being heated by the heating coil.

Specifically, the rotating mechanism is adapted to switch the rotational direction of the metal beverage can after a rotational speed of the metal beverage can reaches a preset speed.

The can holder is inclined in a manner such that a center axis of the metal beverage can is inclined with respect to a vertical direction.

The temperature measuring means is adapted to measure a temperature of an outer circumferential face of the cap situated in an outer circumferential side of the neck portion to which a content held in the metal beverage can is contacted by rotating the inclined metal beverage can.

Thus, according to the present invention, the metal beverage can is held by the can holder but the cap of the can is exposed on the outside of the can holder. The metal beverage can thus held by the can holder is heated by the heating coil situated around the can holder, and temperature of the metal beverage can is measured by the temperature measuring means at the surface of the cap. That is, the temperature measuring means measures the surface temperature of at the cap which is not be effected seriously by the heat transmitted from a portion heated by the heating coil. Therefore, it is possible to accurately measure the temperature of the content held in the metal beverage can.

As described, the induction heating apparatus according to the present invention is provided with the rotating mechanism adapted to rotate the metal beverage can held in the can holder around a center axis of the can holder. Therefore, the content is allowed to be agitated by the rotation, and a liquid level of the content is centrifugally displaced to the neck portion on which the cap is mounted. For this reason, the temperature of the content can be measured accurately by measuring the temperature of the cap.

As also described, the metal beverage can is heated by the heating coil while being rotated by the rotating mechanism, and the rotational direction is switched repeatedly during heating the can. Therefore, agitation of the content is facilitated by an inertial force resulting from switching the rotational direction.

Specifically, the rotating mechanism switches the rotational direction of the metal beverage can after a rotational speed of the metal beverage can reaches a preset speed. Therefore, it is possible to increase the inertial force resulting from switching the rotational direction so that the content can be agitated efficiently.

In addition, the can holder is inclined in a manner such that the center axis of the metal beverage can is inclined with respect to a vertical direction. Therefore, the content is allowed to be agitated efficiently by rotating the metal beverage can.

As also described, the temperature measuring means is adapted to measure a temperature of the outer circumferential face of the cap situated in the outer circumferential side of the neck portion to which a content held in the metal beverage can is contacted by rotating the inclined metal beverage can. That is, it is possible to measure the temperature of the cap at a portion where the temperature thereof is closest to that of the content.

BEST MODE FOR CARRYING OUT THE INVENTION

Figure 2:
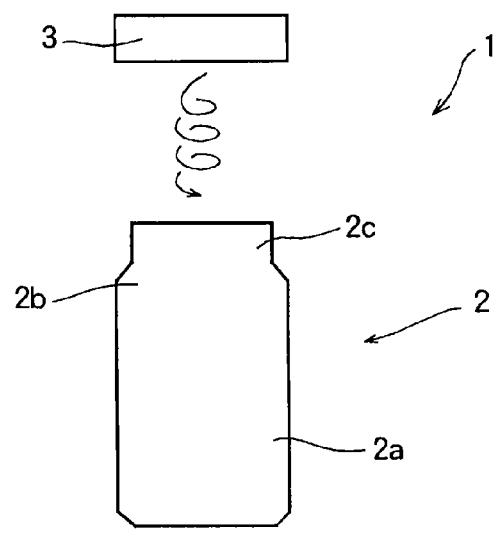
FIG. 2 is a view schematically showing a resealable can heated by the induction heating apparatus of the present invention.

First of all, a structure of the resealable can to be heated by the induction heating apparatus of the present invention will be explained hereinafter. FIG. 2 is a view showing a structure of the resealable can 1. As shown in FIG. 2, the resealable can 1 is comprised of a can body 2 and a cap 3. Specifically, the can body 2 is comprised of a cylindrical can trunk 2a in which a bottom thereof is closed, a truncated conical shaped or hemispherical shaped shoulder portion 2b formed integrally with an upper portion of the can trunk 2a, and a neck portion 2c formed above the shoulder portion 2b. In addition, an upper end of the neck portion 2c is curled outwardly. In order to heat the can body 2 inductively by the current applied to the after-mentioned heating coil, the can body 2 is made of metal material such as iron, stainless, etc. A cap 3 is mounted on the neck portion 2c while covering an upper end portion of the neck portion 2c, and a thread is rolled thereon from an outer circumferential side. Therefore, the resealable can 1 can be resealed by screwing the cap 3 onto the neck portion 2c even after dismounting the cap 3 to drink the content. In addition, it is preferable to widen an opening area of the neck portion 2c if the viscosity of the content to hold is high.

Figure 1:
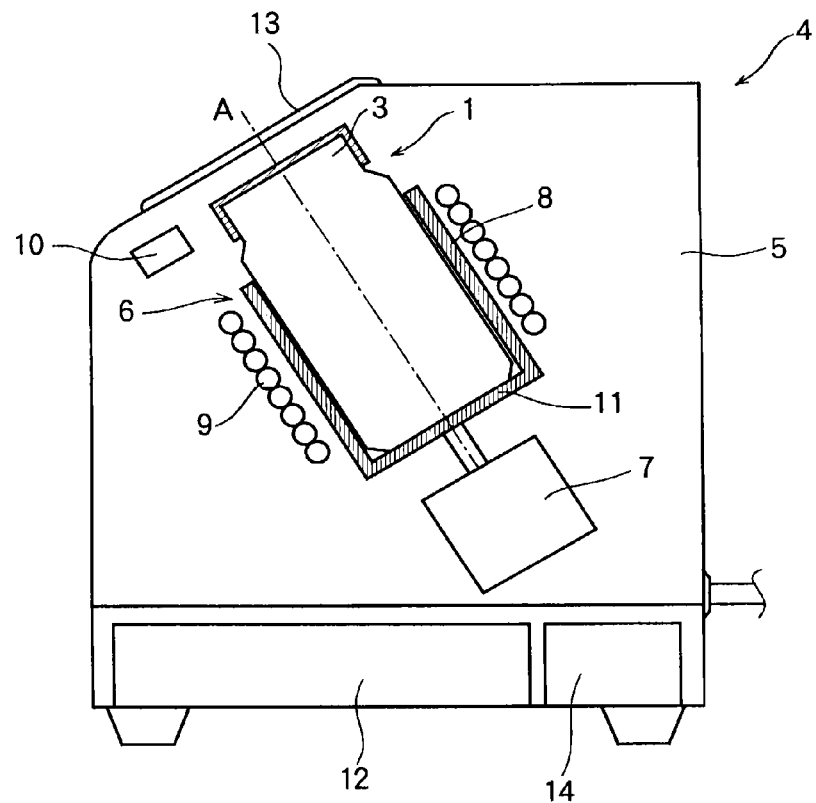
FIG. 1 is a view schematically showing a preferred example of the induction heating apparatus according to the present invention.

Referring now to FIG. 1, a preferred example of the induction heating apparatus 4 is schematically shown. As illustrated in FIG. 1, a cylindrical can holder 6 for holding the resealable can 1 is arranged in a casing 5. Specifically, the can holder 6 is inclined at an angle of predetermined degrees, and a bottom portion of the can holder 6 is connected with a rotating mechanism such as a motor 7 to be rotated around a center axis A. The can holder 6 is comprised of a cylindrical holder portion 8 having an inner diameter slightly larger than an outer diameter of the can body 2 of the resealable can 1 to be held therein, and a heating coil 9 for heating the resealable can 1 inductively is arranged around the holder portion 8. In order to measure a temperature of the cap 3 by a below-mentioned radiation thermometer 10, and to allow the resealable can 1 inserted into the holder portion 8 and dismounted from the holder portion 8, a height of the holder portion 8 (i.e., a length along the center axis A) is shorter than that of the can trunk 2a, that is, the holder portion 8 is situated below the shoulder portion 2b. In addition, in order to rotate the resealable can 1 in a stable manner, the length of the holder portion 8 is preferably longer than a half of entire length of the resealable can 1. To this end, it is especially preferable to maintain the length of the holder portion 8 longer than two thirds of entire length of the resealable can 1.

Figure 3:
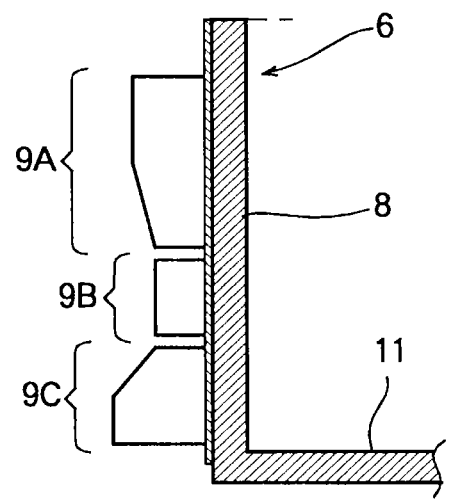
FIG. 3 is a partial sectional view showing one example of a structure of the spiral litz wire of the heating coil.
Figure 3:
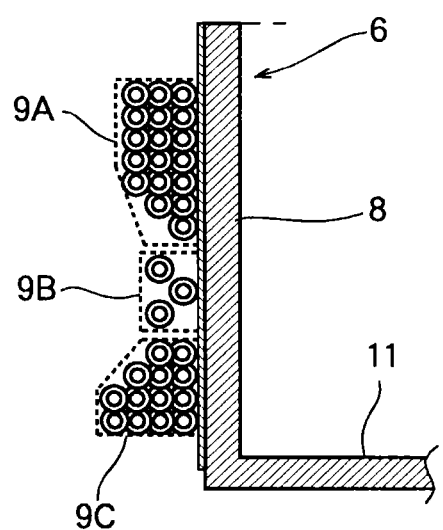

A preferred example of a structure of the heating coil 9 is shown in FIGS. 3(a) and 3(b). It is preferable to use a litz wire prepared by twisting a plurality of copper wires as the heating coil 9 to which the electric current is applied. As shown in FIG. 3(a), the heating coil 9 is comprised of three regions such as a region 9A situated in the vicinity of the opening of the holder portion 8, a central region 9B, and a region 9C situated in the vicinity of the bottom portion 11. Specifically, as shown in FIG. 3(b), the heating coil 9 is wound densely in the regions 9A and 9C, and wound roughly in the region B (that is, wound more times in the regions A and C in comparison with the region B). Provided that the heating coil 9 is wound homogeneously around the holder portion 8, a magnetic flux around the region 9A and a magnetic flux around the region 9C cause interfere with a magnetic flux around the central region 9B. That is, a density of the magnetic flux would be maximized in the central region 9B so that a current is induced excessively within an intermediate portion of the holder portion 8. Consequently, a highest heat would be developed in the vicinity of the intermediate portion of the holder portion 8 thereby damaging a resin coating on the surface of an intermediate portion of the can trunk 2a and an inner coating of the resealable can 1. As a result, appearance of the resealable can 1 and quality of the content may be deteriorated. However, the magnetic flux around the central region 9B may be dampened by reducing a winding number of the heating coil 9 in the central region 9B. As a result, the intermediate portion of the holder portion 8 can be prevented from being heated excessively, in other words, the resealable can 1 is allowed to be heated homogeneously. In this case, therefore, the resin coating on the surface of the can trunk 2a and the inner coating of the resealable can 1 will not be damaged. Therefore, appearance of the resealable can 1 and quality of the content will not be deteriorated thermally. Especially, if a heat-shrinkable label is attached to the outer surface of the resealable can 1, the heat-shrinkable label can be prevented from being damaged by the excessive heat developed in the vicinity of the central region 9B of the heating coil 9.

In order to homogenize the current induced within the resealable can 1, it is preferable to reduce a winding number of the heating coil 9 in the region 9A from the opening side toward the central region 9B, and to reduce a winding number of the heating coil 9 in the region 9C from the bottom portion 11 side toward the central region 9B. In this case, the beverage contained in the resealable can 1 can be heated homogeneously, in addition to avoid the foregoing disadvantages resulting from heating the intermediate portion of the resealable can 1. To this end, in the region 9A, a winding number of the heating coil 9 per unit length in the axial direction of the resealable can 1 (i.e., a winding density) is larger in the region in the vicinity of the opening than that in the region in the vicinity of the central region 9B. Likewise, in the region 9C, a winding number of the heating coil 9 per unit length in the axial direction of the resealable can 1 (i.e., a winding density) is larger in the region in the vicinity of the bottom portion 11 than that in the region in the vicinity of the central region 9B. More specifically, a ratio of the winding density (TA) in the region 9A divided by the winding density (TB) in the central region 9B (TA/TB) is 1.2 to 2.0. Likewise, a ratio of the winding density (TC) in the region 9C divided by the winding density (TB) in the central region 9B (TC/TB) is 1.2 to 2.0. If the above-explained ratio is smaller than 1.2, the concentration of the magnetic fluxes to the central region 9B will not be eased sufficiently. In this case, therefore, the disadvantages caused by an excessive heat development around the central region 9B of the heating coil 9 will not be avoided effectively. In contrast, if the above-explained ratio is larger than 2.0, the intermediate portion of the resealable can 1 will not be heated sufficiently, that is, the resealable can 1 will be heated unevenly. In addition, the winding density in the region 9C of the bottom side is preferably higher than that in the region 9A of the opening side. In this case, the bottom side of the resealable can 1 is heated relatively strongly. As a result, a convection flow of the content is created so that the content is allowed to be heated efficiently and homogeneously.

The can holder 6 is made of heat resistance material transmissive of magnetic flux. For example, the holder 6 may be made of poly-acetal resin, polyether ether ketone resin, polycarbonate rasin, MC Nylon (registered trademark of Quadrant Polypenco Japan Ltd.) or the like.

As shown in the left side in FIG. 1, a radiation thermometer 10 is arranged to be opposed to the cap 3 of the inclined resealable can 1. Therefore, the radiation thermometer 10 is allowed to measure a temperature of the cap 3 at a portion of an outer circumferential side of a site at which the content is gravitationally contacted with an inner surface of the neck portion 2c. For example, a thermistor bolometer, a thermopile or the like adapted to detect an infrared energy may be used as the radiation thermometer 10. In order to measure the surface temperature of the cap 3, not only the above-explained non-contact thermometer but also a contact type thermometer can be used as the radiation thermometer 10. However, according to the present invention, the resealable can 1 is heated while being rotated. Therefore, it is preferable to use the non-contact thermometer as the radiation thermometer 10. In addition, it is preferable to measure the surface temperature of the cap 3 at a portion that will not be effected by a temperature of the trunk portion 2a heated by the heating coil 9. Specifically, it is preferable to measure the surface temperature of the cap 3 at a portion at least 15 mm, more preferably, more than 20 mm away from an upper end of the heating coil 9 in the axial direction of the resealable can 1.

In order to apply a high-frequency current to the heating coil 9, a high-frequency power source 12 is arranged underneath the motor 7. A top lid of the casing 5 is comprised of a cover 13 for covering the opening of the can holder 6, and an operation panel (not shown) is arranged next to the cover 13. Specifically, the operation panel is comprised of a start button for starting the heating, a stop button for stopping the heating, an adjuster button for adjusting a heating degree and so on.

Thus, the resealable can 1 is allowed to be inserted into the can holder 6 by opening the cover 13. In order to allow the resealable can 1 to be dismounted easily from the can holder 6, the upper end portion of the resealable can 1 is exposed on the outside of the can holder 6. Then, the cover 13 is closed and the heating operation is ready to be started using the operating panel. According to this preferred example, the induction heating apparatus 4 is provided with a (not shown) sensor for detecting an opening status of the cover 13 for safety sake. Therefore, if the cover is opened, the heating coil 9 is prevented from being energized.

When the heating operation is started, the can holder 6 is rotated around the center axis A by driving the motor 7. At the same time, the controller 14 orders the power source 12 to apply a high-frequency current to the heating coil 9. Then, when the radiation thermometer 10 detects a fact that the temperature of the resealable can 1 reaches a preset temperature, the induction heating apparatus 4 is stopped automatically. Since the resealable can 1 is thus inductively heated while being rotated, the resealable can 1 is allowed to be heated homogeneously. In addition, the content held in the resealable can 1 is agitated while being heated so that the content can be heated homogeneously. Especially, according to the preferred example, the resealable can 1 is rotated while being inclined at a predetermined degree with respect to the vertical line. Therefore, a turbulence flow of the content is created so that the content is allowed to be heated efficiently and homogeneously. For this purpose, it is preferable incline the resealable can 1 at an angle within 10 to 80 degrees, more preferably, within 30 to 60 degrees with respect to the vertical line.

An inner diameter of the holder portion 8 is substantially identical to an outer diameter of the trunk portion 2a so as to hold the resealable can 1 tightly by contacting the inner surface of the holder portion 8 with the outer surface of the trunk portion 2a. Therefore, the resealable can 1 is allowed to be rotated without slipping on the inner surface of the holder portion 8. As will be explained later, according to the present invention, a rotational direction of the motor 7 is switched suddenly to agitate the content efficiently utilizing an inertial force thereby conforming the temperature of the content to the temperature of the cap 3. In addition, a fluid level of the content being contacted with the inner surface of the resealable can 1 is centrifugally displaced to the neck portion 2c situated inner circumferential side of the cap 3.

For this purpose, it is preferable to rotate the resealable can 1 at the same speed and in the same direction with the motor 7. In addition, the inner face of the can holder 6 is preferably be covered with an elastic sheet made of rubber, sponge, etc.

Figure 4:
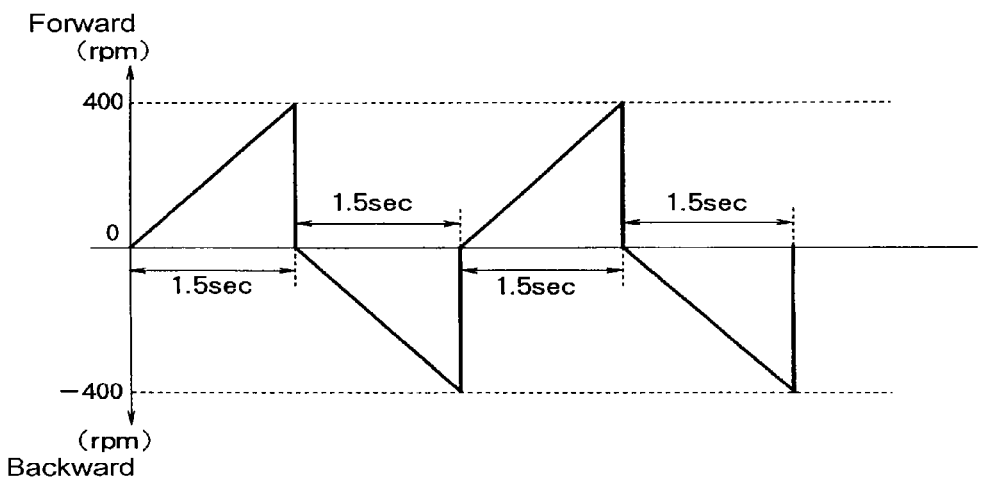
FIG. 4 is a graph indicating a rotational shift pattern of the can holder of the induction heating apparatus.
Figure 5:
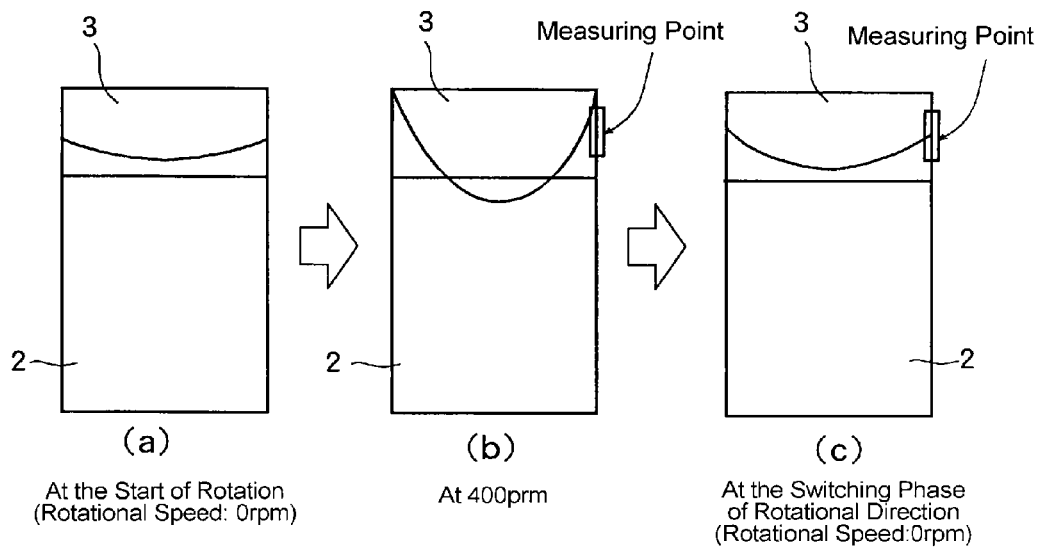
FIG. 5 is a view showing a relation between a rotational speed of the resealable can and a change in a liquid-level of the content.

FIG. 4 is a graph indicating a rotational shift pattern of the can holder 6 of the induction heating apparatus 4. According to the present invention, the rotation direction of the resealable can 1 rotated together with the can holder 6 is switched repeatedly between the forward direction and the reverse direction. To this end, a program determining a length of time of a rotation, rotational direction and a rotational speed is installed in a computer of the controller 14 so that the controller 14 is allowed to control the rotational speed of the motor 7. As shown in FIG. 4, the can holder 6 holding the resealable can 1 is rotated in the forward direction during a first period of 1.5 seconds. In this situation, a rotational speed of the can holder 6 is increased to 400 revolutions per minute, and dropped abruptly to zero by interrupting the current. Then, the rotational direction of the can holder 6 is switched to the reverse direction. As the first period, the can holder 6 is rotated in the reverse direction for 1.5 seconds, and a rotational speed of the can holder 6 is increased to 400 revolutions per minute and dropped abruptly to zero. Then, the rotational direction of the can holder 6 is switched to the forward direction. Thus, the rotational direction of the can holder 6 is repeatedly switched every 1.5 seconds, and the heating operation is stopped when the surface temperature of the cap 3 measured by the radiation thermometer 10 reaches the preset temperature. Therefore, the content is allowed to be agitated effectively utilizing the inertial force without burning to the inner surface of the resealable can 1. In addition, the heat of the resealable can 1 is allowed to be transmitted efficiently to the content so that the heating time will be shortened. Referring now to FIG. 5, a change in a fluid level as the change in the rotational speed of the resealable can 1 is shown. As shown in FIG. 5, the content centrifugally reaches the inner surface of the neck portion 2c situated in the inner circumferential side of the cap 3 during raising the rotational speed to 400 revolutions per minute. Specifically, FIG. 5(a) shows the fluid level of the case in which the rotation has not yet started, that is, the rotational speed is zero, FIG. 5(b) shows the fluid level of the case in which the rotational speed is raised to 400 revolutions per minute, and FIG. 5(c) shows the fluid level of the case in which the rotational direction is switched after the rotational speed reaches 400 revolutions per minute. As described, the resealable can 1 is inclined toward the radiation thermometer 10 so that the content is contacted with the inner surface of the neck portion 2c situated inner circumferential side of the cap 3. Therefore, the heat of the content is transmitted to the cap 3 through the neck portion 2c. As a result, the temperature of the cap 3 is raised to a substantially same level as the temperature of the content.

Example

A surface temperature of the cap 3 was compared with a temperature of the content after the resealable can 1 was heated by the induction heating apparatus thus structured.

A resealable can 1 having a capacity of 170 grams and filled with corn soup having viscosity of 230 cp was heated at 1350 watts. Here, a temperature of the corn soup before heated was 20 degrees C.

The can holder 6 was inclined at an angle of 45 degrees, and rotated 400 revolutions per minute in both forward and reverse directions. The rotation and the heating were stopped when the surface temperature of the cap 3 reached 55 degrees C. Then, the resealable can 1 was dismounted, and a temperature of the resealable can 1 was measured at the surface of the cap 3 (point A), at an upper portion of the trunk portion 2a (point B), and at a lower portion of the trunk portion 2a (point C). After that, the resealable can 1 was shaken in the vertical direction in about 5 seconds, and the temperature of the resealable can 1 was measured by the radiation thermometer 10 at the point B where the temperature of the resealable can 1 seems to be substantially identical to the temperature of the content. Such measurement was carried out nine times, and deviation in temperature was calculated based on the measurement results, and the temperatures measured at foregoing measuring points were compared with the temperature measured at foregoing measuring points after shaking the resealable can 1. The measurement results and standard deviations at foregoing measuring points are shown in the table below.

TABLE 1

| | | | | (Unit: ° C.) |
| Measuring Points | Point A | Point B | Point C | After Shaking the Can |
| --- | --- | --- | --- | --- |
| 1 | 55.0 | 62.0 | 61.8 | 54.2 |
| 2 | 55.6 | 60.4 | 60.2 | 53.5 |
| 3 | 51.3 | 65.9 | 65.5 | 55.8 |
| 4 | 51.6 | 68.1 | 59.0 | 53.8 |
| 5 | 53.9 | 63.3 | 56.5 | 53.7 |
| 6 | 53.2 | 68.1 | 59.4 | 52.5 |
| 7 | 56.2 | 65.2 | 60.0 | 54.2 |
| 8 | 58.2 | 66.4 | 64.3 | 54.8 |
| 9 | 57.5 | 62.1 | 67.4 | 58.7 |
| Average | 54.7 | 64.6 | 61.6 | 54.6 |
| Standard Deviation | 2.4 | 2.8 | 3.5 | 1.8 |

As can be seen from table 1, the temperatures measured at the cap 3 were substantially similar to the temperature measured at the upper portion of the trunk portion 2a after shaking the resealable can 1. However, the temperatures measured at other measuring points were 5 to 10 degrees C. higher than the temperatures measured at the upper portion of the trunk portion 2a after shaking the resealable can 1. In addition, the variation in the temperatures (i.e., standard deviation) measured at the cap 3 was smallest.

Thus, as can be seen from table 1, the temperatures measured at the cap 3 were closest to the temperature of the content, and variation in the measured temperature was smallest. This is because the temperature of the trunk portion 2a was inductively heated by the heating coil 9 so that the temperature of the trunk portion 2a was higher than that of the content. However, the cap 3 was heated indirectly by the heat transmitted from the can body 2 through the neck portion 2c. Therefore, the cap 3 seems not to be heated excessively by the heat transmitted from the trunk portion 2a. Specifically, the cap 3 is heated by the heat of the content contacted to the inner surface of the neck portion 3c as a result of being agitated. Therefore, it is assumed that the temperature of the cap 3 becomes substantially congruent with the temperature of the content.

According to the foregoing example, the holder 6 is inclined at an angle of 45 degrees. However, the present invention should not be limited to the foregoing example. For instance, the resealable can 1 may also be held vertically. With respect to the rotational speed of the can holder 6, the can holder 6 has to be rotated at the speed possible to displace the fluid level of the content centrifugally to the inner surface of the neck portion 2c thereby heating the cap 3. For this purpose, the rotational speed of may be adjusted to be higher or lower than 400 revolutions per minute. Here, if viscosity of the content is high, it is preferable to raise the rotational speed of the can holder 6 to agitate the content effectively. Especially, if the viscosity of the content is higher than 200 cp, it is preferable to rotate the can holder 6 more than 400 revolutions per minute. In addition, the temperature of the cap 3 may also be measured at a top ceiling instead of the lateral circumferential face. For example, if the can holder 6 is rotated more than 600 revolutions per minute, the liquid level of the content will be further raised to a higher level. In this case, therefore, it is more preferable to measure the temperature of the cap 3 at the ceiling by displacing the radiation thermometer 10 to the place to be opposed to the outer surface of the ceiling.

According to the foregoing example, the can holder 6 is rotated by the motor 7 disposed underneath the bottom of the can holder 6. However, the can holder 6 may also be rotated using a roller by arranging the roller in an outer circumferential side of the can holder 6. In addition, an aluminum can may also be used as the resealable can 1 instead of the steel can or a stainless can. However, a heat value of the aluminum can resulting from the induction heating is smaller in comparison with that is the steel can or stainless can, that is, a heating efficiency of the aluminum can is not as good as that of the steel can or stainless can. Therefore, the aluminum can is preferable to be heated while using an appropriate means to improve the heating capacity and efficiency. Further, the heating coil 9 should not be limited to a spiral coil formed by winding the litz wire around the holder portion 8. For example, the heating coil 9 may be wound into variety of shapes such as a C-shape or an arcuate shape.

Lastly, an output power, a rotational acceleration, a maximum rotational speed etc. of the induction heating apparatus according to the present invention may also be adjusted arbitrarily depending on a shape and material of the resealable can 1, a kind of contents and other relative factors.

The invention claimed is:

1. An induction heating apparatus, comprising:
   a can holder configured to hold a resealable metal beverage can having a cylindrical can trunk in which a bottom thereof is closed, a neck portion formed above the cylindrical can trunk, a thread formed on the neck portion, and a cap screwed onto the neck portion to close the can;
   a heating coil disposed around the can holder and configured to inductively heat the metal beverage can held in the can holder; and
   a thermometer configured to measure a surface temperature of the cap of the metal beverage can held in the can holder;
   a rotating mechanism configured to rotate the metal beverage can held in the can holder around a center axis of the can holder; and
   a controller configured to stop a rotation of the rotating mechanism and a heating of the metal beverage can by the heating coil when the surface temperature of the cap measured by the thermometer reaches a predetermined temperature level,
   wherein the can holder is configured to hold the metal beverage can to expose the cap of the metal beverage can inserted on an axially upper side, and
   wherein the can holder is inclined to incline a center axis of the metal beverage can is with respect to a vertical direction,
   wherein the controller is further configured to
   control the rotating mechanism to rotate the metal beverage can being heated by the heating coil for a second in a forward direction and then rotate for another second in a reverse direction that is opposite the forward direction, and
   switch a rotation direction of the metal beverage can until the surface temperature of the cap of the metal beverage can reaches the preset temperature level.

2. The induction heating apparatus as claimed in claim 1, wherein the rotating mechanism repeatedly switches a rotational direction of the metal beverage can being heated by the heating coil.

3. The induction heating apparatus as claimed in claim 2, wherein the controller is configured to switch the rotational direction of the metal beverage can after a rotational speed of the metal beverage can reaches a preset speed.

4. The induction heating apparatus as claimed in claim 1, wherein the thermometer is configured to measure a temperature of an outer circumferential face of the cap situated in an outer circumferential side of the neck portion to which a content held in the metal beverage can is contacted by rotating the inclined metal beverage can.

* * * * *